(12) United States Patent
Ishikawa et al.

(10) Patent No.: US 7,744,121 B2
(45) Date of Patent: Jun. 29, 2010

(54) AIRBAG, AIRBAG APPARATUS, AND METHOD FOR FOLDING AIRBAG

(75) Inventors: Tomotaka Ishikawa, Fuji (JP); Hideaki Saito, Fuji (JP); Takashi Ueda, Fuji (JP); Hiroyuki Iwamoto, Fuji (JP); Mitsuhiro Yoshida, Fuji (JP)

(73) Assignee: Nihon Plast Co., Ltd. (JP)

( * ) Notice: Subject to any disclaimer, the term of this patent is extended or adjusted under 35 U.S.C. 154(b) by 358 days.

(21) Appl. No.: 11/878,995

(22) Filed: Jul. 30, 2007

(65) Prior Publication Data

US 2008/0030011 A1   Feb. 7, 2008

(30) Foreign Application Priority Data

Aug. 1, 2006   (JP) ............... 2006-210216

(51) Int. Cl.
    *B60R 21/237*   (2006.01)
(52) U.S. Cl. ............... 280/730.2; 280/743.1
(58) Field of Classification Search ............ 280/743.1, 280/730.2, 728.1
    See application file for complete search history.

(56) References Cited

U.S. PATENT DOCUMENTS

| 6,196,585 | B1 * | 3/2001 | Igawa ............ 280/743.1 |
| 7,261,682 | B2 * | 8/2007 | Crookston et al. ...... 493/457 |
| 7,404,790 | B2 * | 7/2008 | Sugaya et al. ............ 493/458 |
| 2003/0116947 | A1 * | 6/2003 | Yokoyama et al. ....... 280/730.2 |
| 2004/0164530 | A1 | 8/2004 | Sunabashiri |
| 2005/0110256 | A1 | 5/2005 | Crookston et al. |
| 2007/0126221 | A1 * | 6/2007 | Yoshida ............... 280/743.1 |

FOREIGN PATENT DOCUMENTS

| GB | 2 433 056 A | 6/2007 |
| JP | 2002-316609 | 10/2002 |
| JP | 2003-146174 | 5/2003 |
| JP | 2004-058848 | 2/2004 |

* cited by examiner

*Primary Examiner*—Paul N Dickson
*Assistant Examiner*—Drew Brown
(74) *Attorney, Agent, or Firm*—NDQ&M Watchstone LLP

(57) ABSTRACT

An airbag, which is folded and assembled elongatedly, is deployed along a side window. The airbag has a folded portion and a pleated portion which wraps the folded portion under the assembled condition. The airbag also has an inner tube which is provided from the inside of an infusion portion to the inside of an upstream portion of an inflating portion. The inner tube prevents that the airbag is damaged by heat of inflation gas. When the airbag is assembled, the inner tube is positioned along a first fabric, which is developed so that the surface of the first fabric faces an inside of a vehicle compartment, by the infused fluid. Deployment performance of the airbag (curtain airbag deploying along a side window of an automobile) is improved.

5 Claims, 6 Drawing Sheets

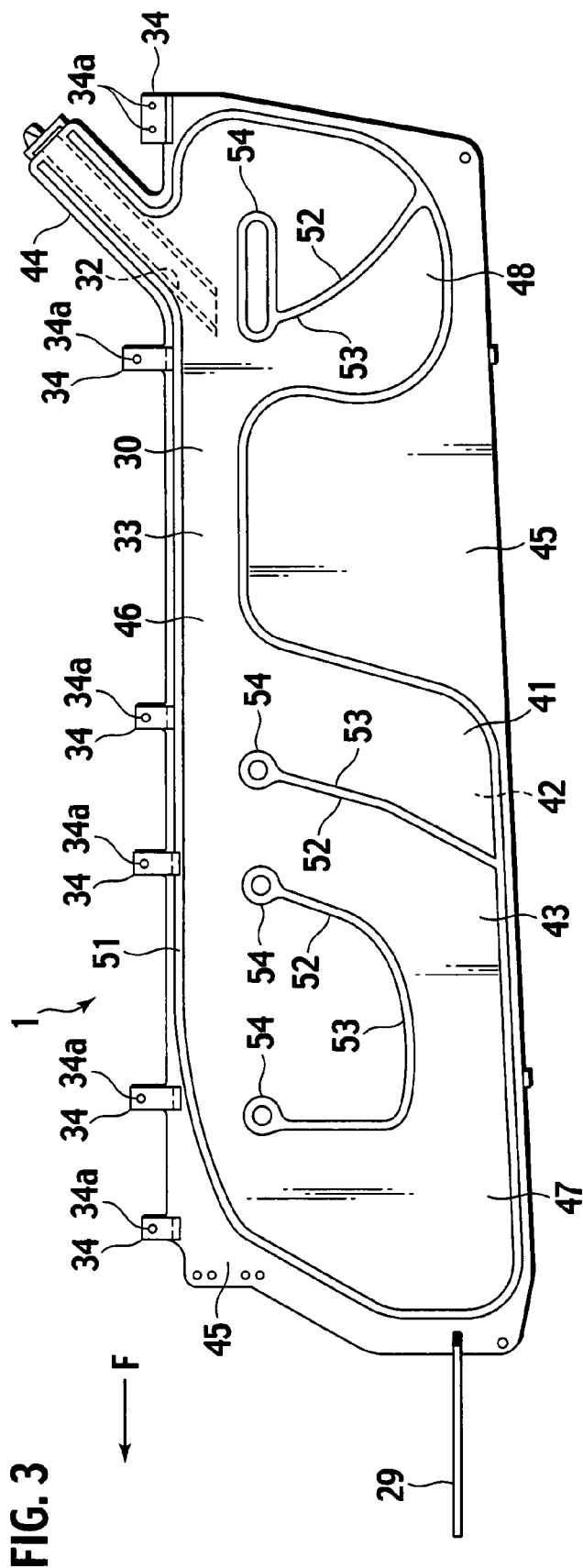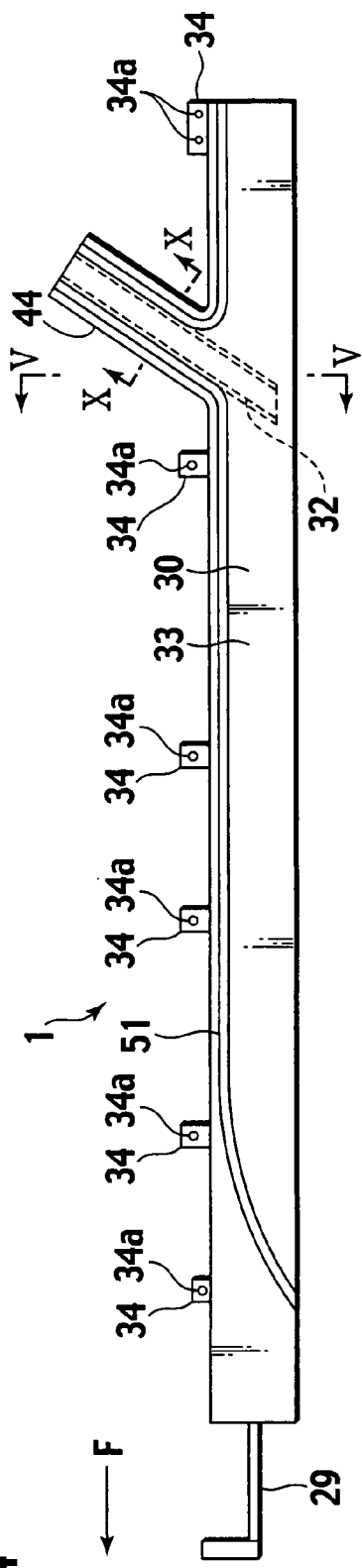

AIRBAG, AIRBAG APPARATUS, AND METHOD FOR FOLDING AIRBAG

BACKGROUND OF THE INVENTION

1. Field of the Invention

The present invention relates to an airbag which deploys, for example, along a side window inside a vehicle compartment, an airbag apparatus having the airbag, and a method for folding the airbag.

2. Description of the Related Art

With regard to an airbag apparatus having an airbag which is inflated and deployed by inflation gas, a curtain airbag apparatus has been known. The curtain airbag apparatus has an airbag which deploys planarly along side windows inside a vehicle compartment. In this kind of the airbag apparatus, an airbag is folded and assembled elongatedly and installed along an upper edge of the side windows inside the vehicle compartment. When the vehicle receives impact by side impact or rollover, an inflator infuses gas into the airbag. The gas is infused into a bag-shaped inflating portion via a tubular infusion portion of the airbag. Then, the airbag is inflated and deployed downwardly along the side windows.

In this kind of airbag, a separated fabric (flow control fabric) is attached from a gas infusion portion to an inflating portion to protect the gas infusion portion from heat of gas (see Japanese Laid-open Patent Application No. 2003-146174 [page. 5, FIGS. 4 and 6]).

Furthermore, method for folding a curtain airbag is also known (see U.S. Patent Application Publication No. 2005/0110256 [FIGS. 1 and 2D]). In the above method, the airbag is rolled from the lower edge and the upper potion of the rolled potion is formed as a pair of flattened pleats. The pair of pleats wraps the rolled potion. With this folding pattern, the pair of flattened pleats is quickly inflated, and then the rolled portion is deployed.

SUMMARY OF THE INVENTION

However, if the fabric, which is attached from the gas infusion portion to the inflating portion, is adapted to the above-mentioned structure, edge of the fabric is rolled with the inflating portion or folded haphazardly.

The present invention has been made in view of the point of view as described above. An object of the present invention is to provide an airbag, an airbag apparatus, or method for folding an airbag which can improve deployment performance of an airbag.

A first aspect of the present invention provides an airbag which comprises (a) an airbag main portion and (b) an inner tube. The airbag main body includes (x) a gas infusion portion through which gas is infused into an inside of the airbag main portion, and (y) an inflating portion which is communicated with the gas infusion portion and has first and second fabrics between which the gas is infused through the gas infusion potion to inflate the inflating portion. The inner tube is provided from the inside of the gas infusion portion to the inside of an upstream portion of the inflating portion. The upstream portion of the inflating portion is pleated to form a pleated portion in which the first and second fabrics form a pair of pleats extending counter directions each other. The inner tube is folded with any one of the pleats.

With the first aspect of the present invention, when the gas is infused into the gas infusion portion, the pleated portion, which is communicated with the infusion portion and formed by pleating the inflating portion, is firstly deployed. In addition, the inner tube protects the airbag main portion from heat of the infused gas. Furthermore, since the inner tube is folded with any one of the pleats, folded pattern of the inner tube constantly becomes a uniform pattern and the infused gas is firmly infused into the pleated portion to stabilize the deployment performance.

A second aspect of the present invention provides an airbag which has all the features of the above-mentioned first aspect of the present invention. Furthermore, a downstream portion of the inflating portion is folded to form a folded portion which is folded to be wrapped by the pleated portion. The pleated portion is an upstream portion of the inflating portion and is pleated so that the first and second fabrics form a pair of pleats extending counter directions each other. And, the folded portion is a downstream portion of the inflating portion and is wrapped by the pleated portion.

With the second aspect of the present invention, when the gas is infused into the gas infusion portion, the pleated portion, which is communicated with the infusion portion and formed by pleating the inflating portion, is firstly deployed. The deploying pleated portion guides ejection of the folded portion to the desired direction. Then, the folded portion is inflated and deployed to achieve quick and smooth deployment of the airbag. In addition, the inner tube protects the airbag main portion from heat of the infused gas. Furthermore, since the inner tube is folded with any one of the pleats, folded pattern of the inner tube constantly becomes a uniform pattern and the infused gas is firmly infused into the pleated portion to stabilize the deployment performance.

A third aspect of the present invention provides an airbag apparatus which comprises (i) an airbag of the above-mentioned airbag of the second aspect of the present invention and (ii) an inflator. The airbag deploys along a side window inside a vehicle compartment. The inflator infuses gas into the gas infusion portion of the airbag. And, the first fabric of the airbag is developed so that the surface of the first fabric faces the inside of the vehicle compartment. Furthermore, the inner tube of the airbag is folded with the pleat of the first fabric.

With the third aspect of the present invention, since it comprises the airbag of the second aspect of the present invention, the deployment performance, that the airbag deploys quickly and smoothly along the side window inside the vehicle compartment, is achieved. In addition, since the inner tube of the airbag is folded with the pleat of the first fabric (the surface of the first fabric faces the inside of the vehicle compartment at the deployment), the inside pleat of the pleated portion inflates more quickly than the outside pleat of the pleated portion at the initial stage of the deployment. Then, the deployment direction of the folded portion is regulated outward (to the direction along the side window) to achieve the good and stable deployment performance of the airbag.

A fourth aspect of the present invention provides a method of folding the airbag of the above-mentioned first aspect of the present invention. The method comprises (1) infusing fluid into the inside of the inner tube from a prescribed direction to inflate the inflating portion and detach the first and second fabrics each other, and (2) pleating the inflating portion to form the pleated portion under the condition where the inner tube is positioned along any one of the first or second fabric by the infused fluid.

With the fourth aspect of the present invention, the pleated portion is pleated so that the first and second fabrics form the pair of pleats extending counter directions each other. The preferred folding pattern to fold the inner tube with any one of the pleats is achieved.

A fifth aspect of the present invention provides a method of folding an airbag of the above-mentioned second aspect of the present invention. The method comprises (1) folding the inflating portion to form the folded portion which is apart from the gas infusion portion, (2) infusing fluid into the inside of the inner tube to inflate the inflating portion except the folded portion and detach the first and second fabrics each other, and (3) pleating the inflating portion except the folded portion to form the pleated portion under the condition where the inner tube is positioned along any one of the first or second fabric by the infused fluid.

With the fifth aspect of the present invention, the preferred folding pattern for stable deployment performance to deploy the airbag quickly and smoothly is achieved.

BRIEF DESCRIPTION OF THE DRAWINGS

FIG. 3 is a side view of the developed airbag.

FIG. 4 is a side view of the folded airbag.

DETAILED DESCRIPTION OF THE INVENTION

Hereinafter, embodiments of an airbag, an airbag apparatus, and method for folding an airbag according to the present invention will be described with reference to the drawings.

Figure 2:
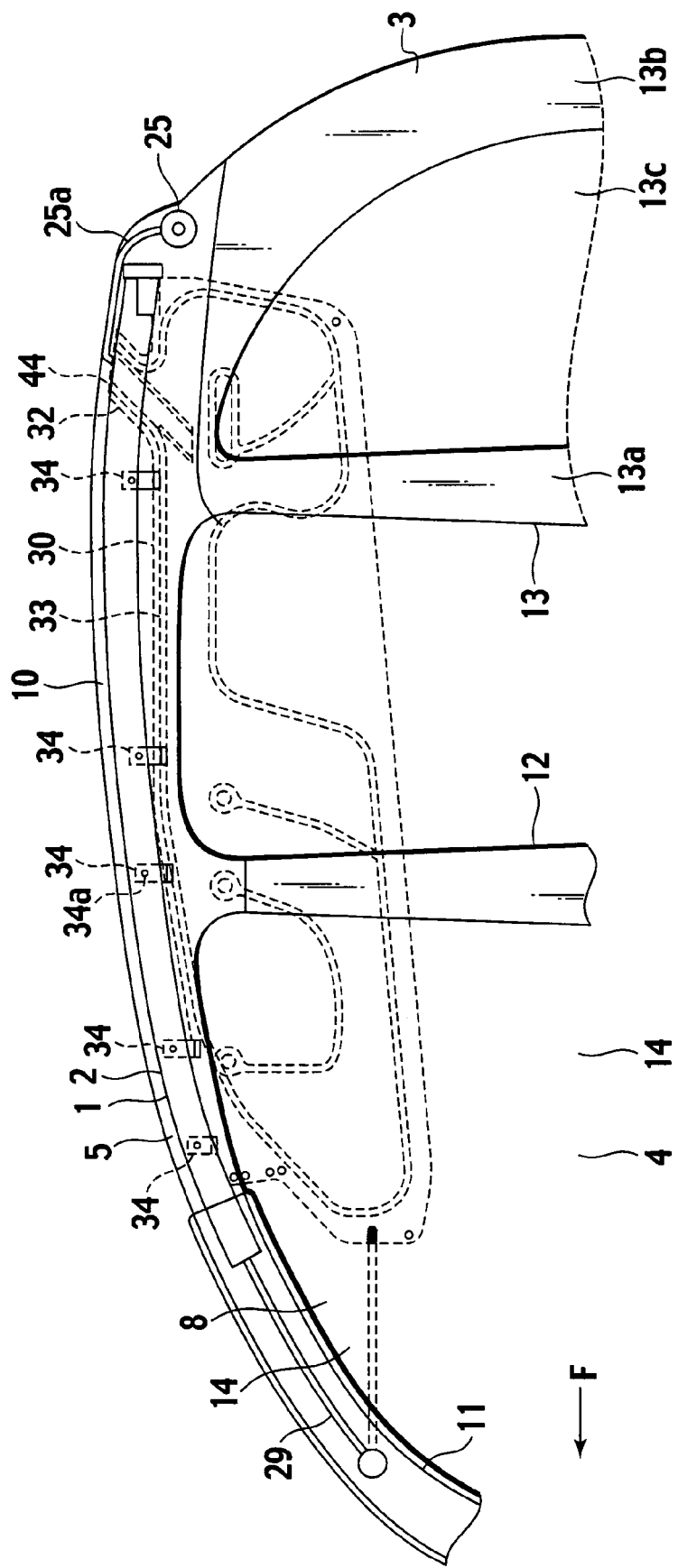
FIG. 2 is a side view illustrating an airbag apparatus with the above airbag installed on a vehicle body.
Figure 5:
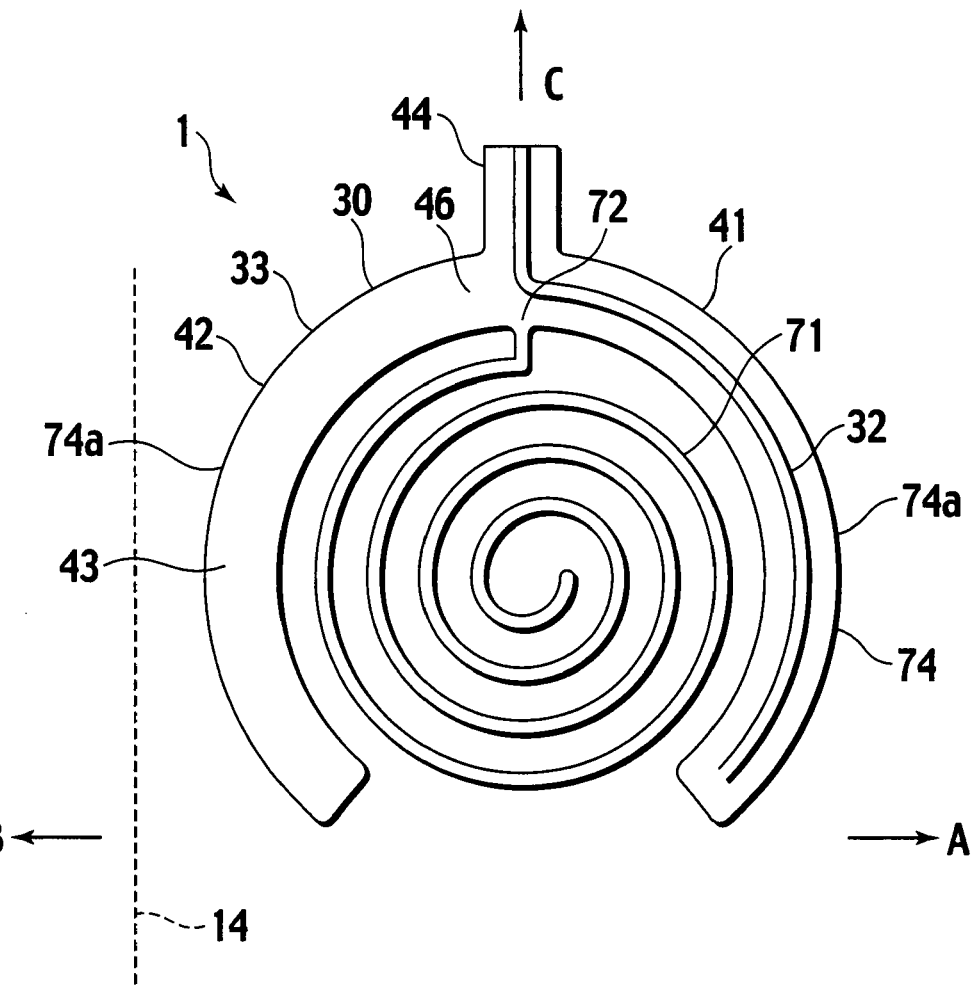
FIG. 5 is a cross-sectional view of the folded airbag shown in FIG. 4, taken along the line V-V in FIG. 4.

As shown in FIGS. 2 to 5, an airbag apparatus 2 comprising an airbag 1 is also called a curtain airbag apparatus. The airbag apparatus 2 is installed on a containing position in a compartment 4 of a vehicle (automobile) body 3. The containing position is a roof side area 5 positioned on upper edges of door openings. The airbag 1 is also called curtain airbag, side impact airbag, inflatable curtain, head protect airbag, and so on. The airbag 1 deploys planarly beside an occupant to protect the occupant. Hereinbelow, the directions such as "forward (front)", "backward (back)", "upward (upper)", "downward (lower)", and "side(s)" are regulated based on the traveling direction of the vehicle. In FIG. 5, the arrow A points to the inside of the compartment, the arrow B points to the outside of the compartment, and the arrow C points upward. In FIGS. 2 to 4, the arrow F points forward.

As sown in FIG. 2, the body 3 of the automobile has a front seats and rear seats in the compartment 4, on which the occupants sit. Doors (not shown in the drawings) are provided correspondingly with the seats. A side window 8 as openable opening is provided on the upper portion of respective doors. The side windows 8 constitute a specific plane 14. A front pillar (A-pillar) 11, a center pillar (B-pillar) 12, and a rear pillar (C-pillar) 13 are provided from front to rear at each of the both sides of the compartment 4. The specific plane 14 is constituted by the side windows 8, doors, and pillars 11 to 13 at each side of the compartment 4. In addition, a body panel (also called roof side rail) 10 is provided on the upper ends of the pillars 11 to 13 (on the upper edges of the side windows 8) at each side of the compartment 4. A roof panel is supported by the body panels 10. Furthermore, a front windshield is provided between the front pillars 11 and a rear windshield is provided between the rear pillars 13. The roof side area 5 (containing position of the airbag apparatus) extends from the side edge of the roof panel to the most part of the front pillar 11 at each side of the compartment 4. The specific plane 14, along which the airbag 1 deploys, extends downward from the roof side area 5 at each side of the compartment 4.

Inner surfaces of the body panels 10 and the roof panel are covered with a headlining (roof lining: not shown in the drawings), which is a soft and deformable interior trim panel. The upper end portions of the pillars 11 to 13 are also covered with the headlining. A seatbelt is provided with each seat and a seatbelt anchor is provided on the each center pillar 12. In addition, a first to third pillar garnishes (interior trim material) are attached on the inside surfaces of the pillars 11 to 13, respectively. Each garnish covers the pillar entirely or partially. Furthermore, not shown in the drawings, packings, which are made of soft and elastic-deformable plastic, are attached on the lower edge of the body panel 10. The packing is also called welt or body seal and closely contacted with the edge of the closed door.

Here, the term "center pillar 12" doesn't mean merely a pillar positioned center in front-back direction but a pillar covered by the deployed airbag. And, some kind of vehicle may have four or more pillars at one side. Here, the third and more backward pillars are explained as the rear pillars 13. In the present embodiment, the rear pillar 13 is constituted by a first rear pillar 13a, a second rear pillar 13b and a window 13c therebetween.

The airbag apparatus 2 is an airbag to be able to protect occupants on front and rear seats. The airbag apparatus 2 comprises the airbag 1, an inflator 25 and so on. The airbag 1 is folded elongatedly and stowed in a roof side area 5, which is surrounded by the body panel 10, headlining and so on. The inflator 25 is installed at the backward or upward of the rear seats, and functions as a gas generator to supply the airbag 1 with gas. In addition, the airbag apparatus 2, if required, comprises a mounting bracket, a plastic protector, a sleeve, a tether belt 29 and so on. The mounting bracket is made by press working of a metal plate which mounts the airbag 1 on the body panel 10. The protector is attached along the folded airbag land protects the airbag 1 at the deployment. The sleeve is a tearable tubular or string-like element to keep the folded state of the airbag 1. The tether belt 29 is connected to the front end of the airbag 1.

The airbag 1 is constituted by an airbag main portion 30, an inner tube (inner bag) 32 and so on. The airbag main portion 30 is made by a single fabric or a combination of fabrics. For example, the airbag main portion 30 is made by folding back a single fabric and sewing its edge or by layering two fabrics and sewing their edges. The inner tube 32 is an inner tube incorporated in the airbag main portion 30.

As shown in FIG. 3, the airbag main portion 30 comprises a main bag 33 and mounting tabs 34. The main bag 33 is formed as a flat bag. Each of the mounting tabs 34 extends outward from the edge of the main bag 33 and used for mounting the main bag 33 to the vehicle body. The airbag main portion 30 is folded elongatedly and installed on the roof side area 5.

The main bag 33 comprises a bag-shaped inflating portion 43, a tubular gas infusion portion 44, and a non-inflating portion 45. The inflating portion 43 is made by layering a first fabric 41 (positioned inside) and a second fabric 42 (positioned outside) and sewing them along prescribed joining portions (sewing portions). The inflating portion 43 inflates and deploys by being infused gas. The gas infusion portion 44 opens the inside chamber of the inflating portion 43 to the external. Gas is not infused into the non-inflating portion 45 and the non-inflating portion 45 does not inflate.

The inflating portion 43 has the chamber and comprises a gas guiding portion 46, a front protection portion (a first inflating portion) 47 and a rear protection portion (a second inflating portion) 48. The gas guiding portion 46 is provided along the upper edge of the main bag 33. The front and rear protection portions 47, 48 are provided under the gas guiding portion 46 (on the downstream of the gas guiding portion 46). The gas guiding portion 46 inflates along the entire upper edge of the main bag 33. In other words, the gas guiding portion 46 inflates with tubular shape along the front-back direction.

In the present embodiment, the gas infusion portion 44 has a tubular shape and extends diagonally backward from the rear upper edge of the main bag 33.

Along the joining portions, two fabrics are joined almost air-tightly or highly air-tightly by sewing, adhesive bonding, or simultaneous use of sewing and sealing. The joining portion comprises an outer circumferential sewing portion 51 and restricting portions 52. The outer circumferential sewing portion 51 is positioned along the outer circumferential edge of the inflating portion 43. The restricting portions 52 restrict the excessive inflation of the protection portions 47, 48 to regulate the inflating thickness. The restricting portions 52 are positioned within the area surrounded by the outer circumferential sewing portion 51 to segment the protection portions 47, 48. The restricting portion(s) 52 is provided at one position or at two or more positions within the inflating potion 43. The restricting portion 52 is provided integratedly or separately with the outer circumferential sewing portion 51. Each of the restricting portions 52 has a linear portion 53 and a ring portion 54. The ring portion 54 is positioned on the edge of the linear portion 53 or on an upper stream of the gas flow to protect linear portion 53.

The mounting tabs 54 are provided at prescribed positions on the upper edge of the main bag 33. Each of the mounting tabs 54 is formed integratedly with the fabrics of the main bag 33. For example, each of the mounting tabs 54 is made by sewing the layered first and second fabrics. Each of the mounting tabs 54 extends outward from the edge of the main bag 33. A mounting hole(s) 34a is made on each of the mounting tabs 54.

The inner tube 32 is also called "inner bag" or "inner pipe". The inner tube 32 guides gas flow and protects the airbag main portion 30 from the heat of gas. The inner tube 32 extends within the entire length of the gas infusion portion 44 and its lower end runs into the gas guiding portion 46 of the main bag 33. The inner tube 32 is made by two layered fabrics which are bent and their edges are sewn integrally with the gas infusion portion 44 at the outer circumferential sewing portion 51. The sewn line of the inner tube 32 is positioned at the front side of the gas infusion portion 44 and its outer surface is closely-attached with the inner surface of the gas infusion portion 44. The distal end of the inner tube 32 is cut almost horizontally.

Furthermore, gas is infused between the first and second fabrics 41, 42 via the infusion portion 44. And, as mentioned above, dividers (the restricting portions 52) are provided between the first and second fabrics 41, 42 by sewing and so on to restrict the inflating thickness of the inflated airbag.

Next, (1) the folding process of the airbag 1, (2) the assembling process of the airbag apparatus 2 and (3) the installing process for installing the airbag apparatus 2 onto the vehicle body, are described.

As shown in FIG. 1 and FIGS. 6 to 9, folding apparatus 61 for folding the airbag 1 comprises a table 63, a bracket 65, an air injection tube (a fluid supply means) 67, a blade 69 and so on. The table 63 has a flat working plane 62. The bracket 65 is provided beside one side of the table 63 and is integrated with a bracket base 65. The air injection tube 67 is provided beside the bracket 65 and its position can be changed at one side of the bracket 65 or another side. The bracket 65 is made by bending a metal plate and has a U-shaped cross section to hold the folded airbag 1 thereon. Gates 65a are provided on both side of one end of the longitudinal direction of the bracket 65 to bring out the gas infusion portion 44. The bracket base 64 is detachable from the bracket 65 and holds the bracket 65 movably up and down. The air injection tube 67 injects the air at a prescribed pressure and is positioned beside any one of the gates 65a (see FIG. 7, the air injection tube 67L or 67R). The blade 69 is movable transversely and longitudinally and a reverse U-shaped cross section to be opened its opening downward. The blade 69 moves longitudinally along the upper working plane 63 of the table 62 and can be within the bracket 65.

In the folding process of the airbag 1, the main bag 33 of the airbag main portion 30 is extended planarly on the working plane 62 of the table 63. Then, the gas infusion portion 44 is brought out from one of the gates 65a and the air injection tube is inserted into the inner tube 32 within the gas infusion portion 44.

Figure 6:
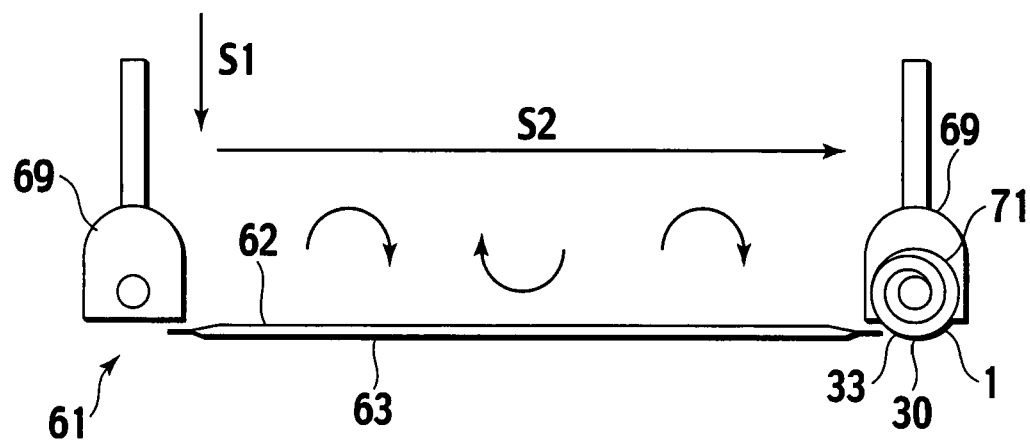
FIG. 6 is a side view illustrating a folding process of the airbag.
Figure 7:
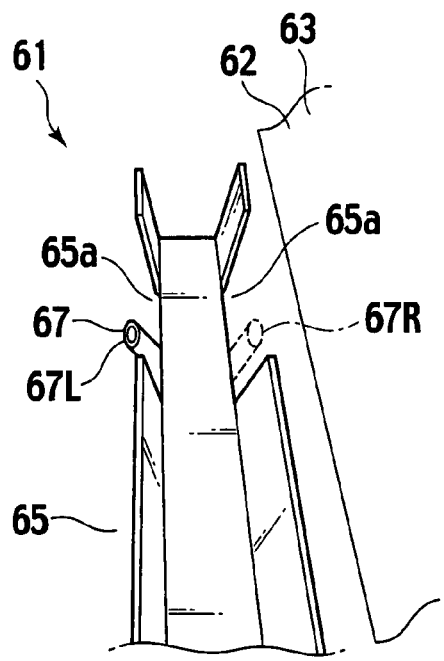
FIG. 7 is a perspective view illustrating an upstream portion of a folding apparatus for folding the airbag.
Figure 8:
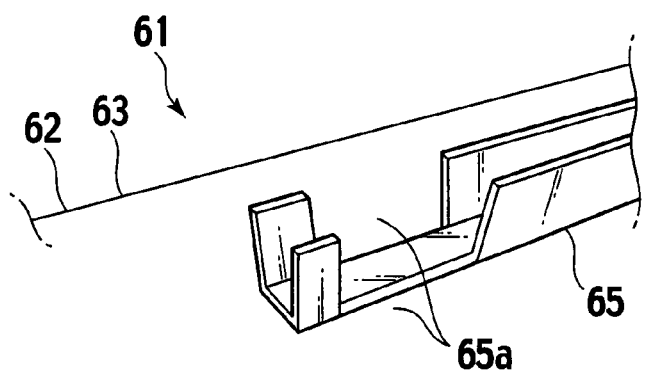
FIG. 8 is a perspective view illustrating an upstream portion of a folding apparatus for folding the airbag.

From the condition mentioned above, the blade 69 is moved downward to the position of the edge (lower edge after the airbag deployment) of the main bag 33 (see S1 in FIG. 6). Then, the blade 69 is moved to another edge (upper edge after the airbag deployment) of the main bag 33 along the working plane 62 of the table 63 (see S2 in FIG. 6). During this move, the main bag 33 is folded from the distal end to the base end to roll the inflating portion 43 within the inside of the blade 69 upon a working plane 62 corresponding the specific plane 14 (see FIG. 5) and form the folded portion (stowed portion, rolled portion) 71.

Figure 1C:
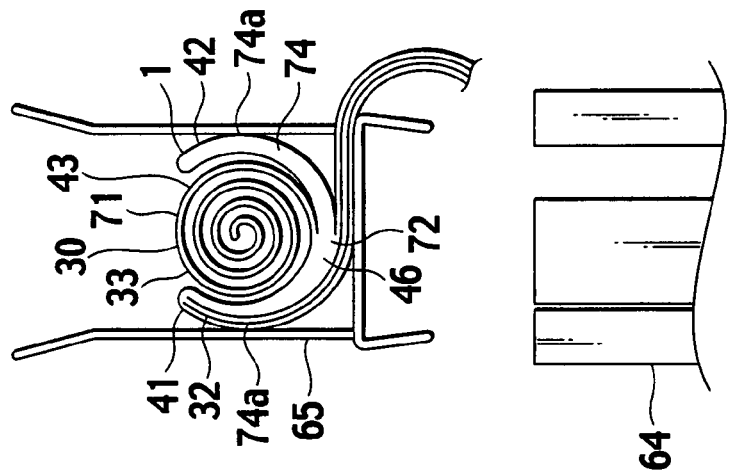
FIG. 1C is a sectional view illustrating a folding process (3rd process) of an airbag according to one embodiment of the present invention.
Figure 1B:
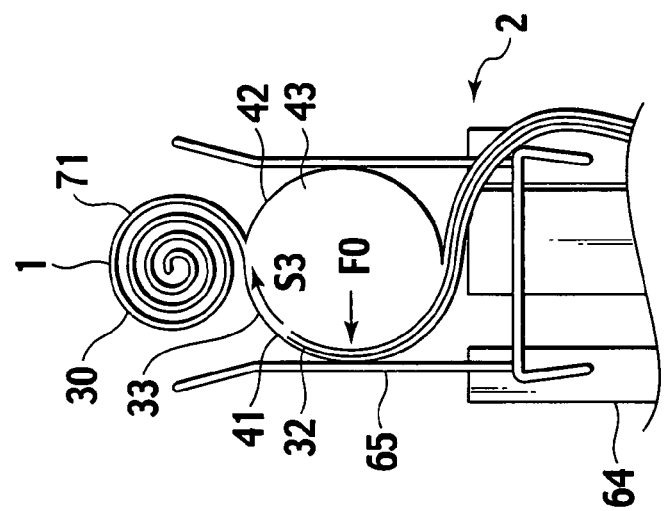
FIG. 1B is a sectional view illustrating a folding process (2nd process) of an airbag according to one embodiment of the present invention.
Figure 1A:
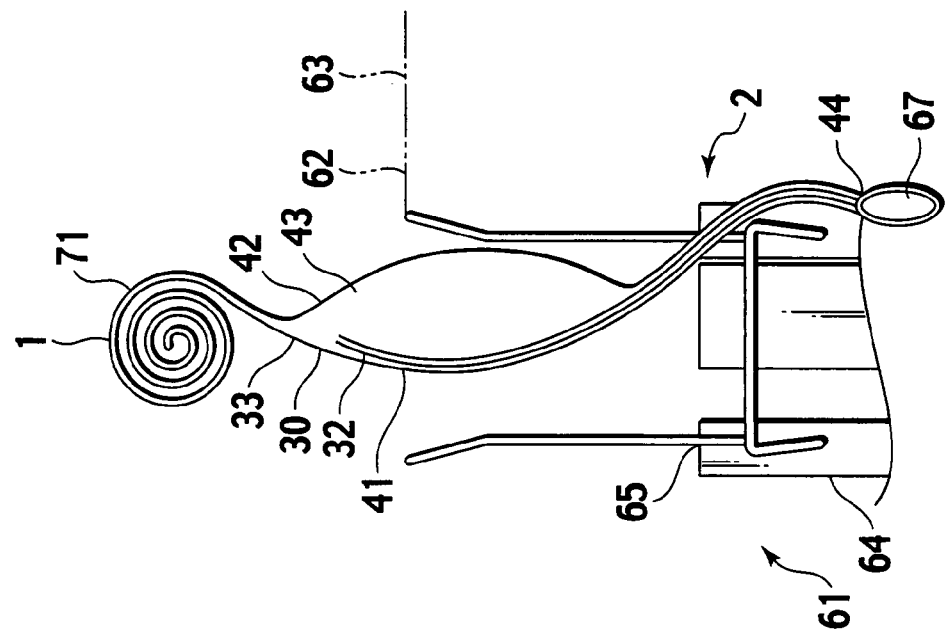
FIG. 1A is a cross-sectional view illustrating a folding process (1st process) of an airbag according to one embodiment of the present invention.
Figure 10:
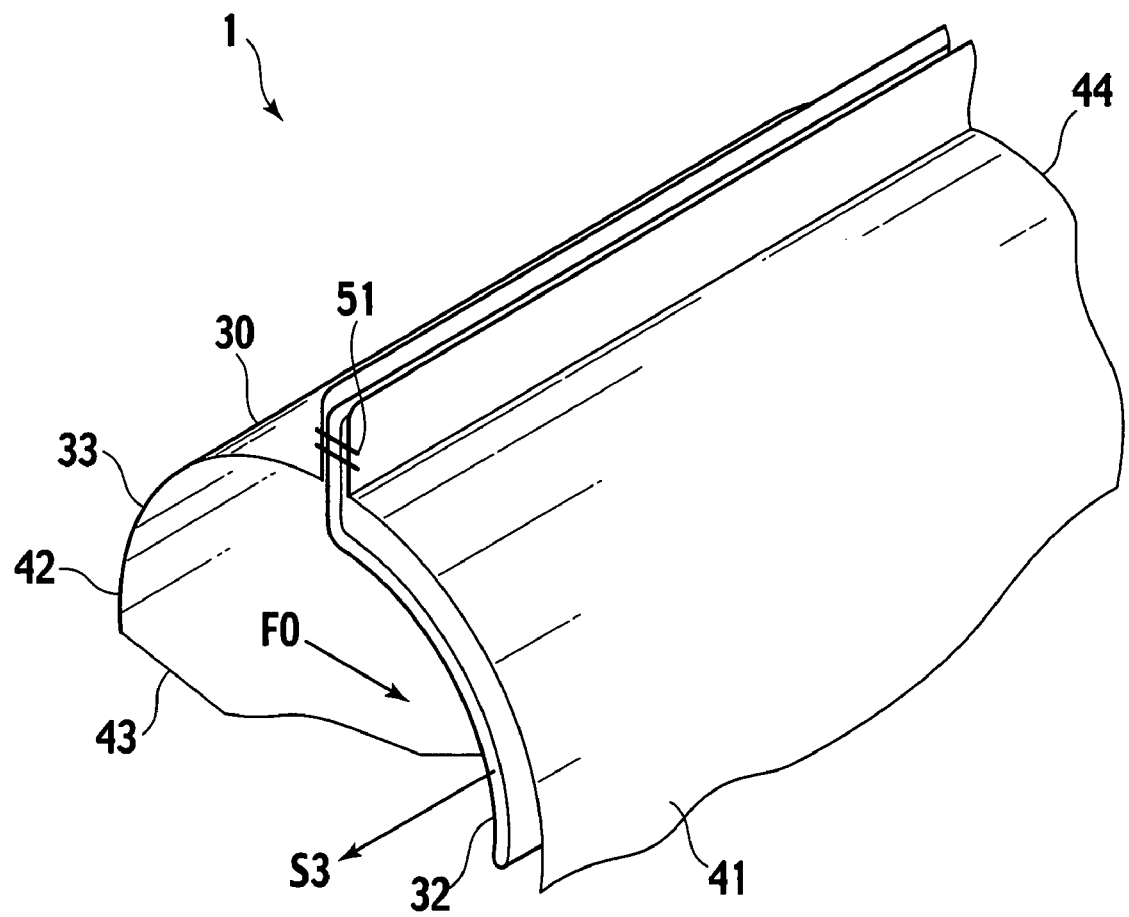
FIG. 10 is a perspective cross-sectional view of a gas infusion potion, taken along the line X-X in FIG. 4.

Parallel to this folding process of the folding portion 71 or at the timing of completion of the folding process of the folding portion 71, air is injected at the prescribed pressure from the air injection tube 67 to the inside of the airbag 1, as shown FIGS. 1A and 1B. Then, the air is supplied from the open end of the inner tube 32 into the inside of the inflating portion 43 (except the folded portion 71), as shown by an arrow S3 in FIGS. 1B and 10. The injected air inflates the inflating portion 43 (except the folded portion 71) to some extend and detach the first and second fabrics 41, 42 each other. At the same time, since the air is injected from the air injection tube 67 positioned any one side of the bracket 65, the injected air generates force F0 (see FIGS. 1B and 10) to move the open end of the inner tube 32 to the opposite side of the air injection tube 67. As a result, the force F0 put the open end of the inner tube 32 onto the inner surface of any one of the first or second fabric 41, 42. In a case shown in FIGS. 1A to 1C, since the air injection tube 67 is provided on the side of the second fabric 42, the open end of the inner tube 32 is put onto the inner surface of the first fabric 41 positioned inside (on the side of the compartment 4).

Figure 9:
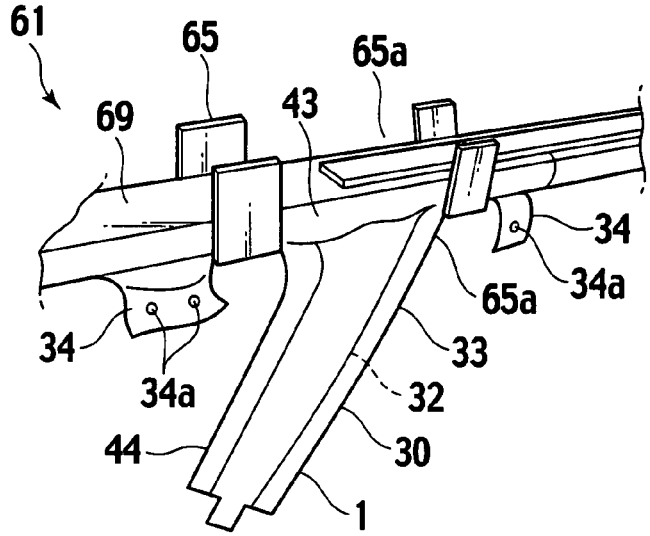
FIG. 9 is a perspective view illustrating a folding process of the airbag.

From the condition mentioned above, the bracket 65 is moved upward and the folded portion 71 being held by the blade 69 is relatively tucked into the inside of the bracket 65, as shown in FIGS. 1B, 1C and 9, and the air being filled in the inflating portion 43 is discharged by suction or the like. As a result, the upstream portion of the inflating portion 43 positioned on a base side of the folded portion 71 (upper side at the airbag deployment), in other words, the gas guiding portion 46 is extended to the both counter side to form the pleated portion 74. The pleated portion 74 has a pair of flattened pleats 74a extending counter directions. The pair of pleats 74a extend so that their extending center is the gas flow position 72 (see FIG. 5) and form crossing cross section with the gas infusion portion 44 and the folded portion 71. The gas flow portion 72 is communicated with the gas infusion portion 44 directly and linearly. The inner tube 32 is folded within any one of the pleats 74a (in the present embodiment, within the pleat 74a of the first fabric 41). In addition, the pleated portion 74 (the pair of pleats 74a) is folded to wrap the folded portion 71 from the base side of the folded portion 71 (upper side at the airbag deployment). The cross section of the folded airbag 1 has an umbrella-like figure.

The airbag 1, which has the main bag 33 folded in a above-mentioned prescribed elongated folded pattern, is took out from the bracket 65 and is covered with the sleeve (not shown) The mounting tabs 34 are pulled out from slits formed on the sleeve and then the airbag 1 being held its folded pattern shown in FIGS. 4 and 5 is completed.

The protector may be attached to the airbag 1 folded in this manner, if it is needed. And then the mounting brackets are attached to the mounting tabs 34 and a connecting pipe 25a extending from the inflator 25 is connected to the gas infusion portion 44 positioned at the rear portion of the airbag 1. As mentioned above, the module of the airbag apparatus 2 (curtain airbag module) is assembled.

Next, this module is carried into the vehicle compartment 4 and the installation process is done to install the module onto the vehicle body 3 before fixing the interior trims such as the headlining, the pillar garnishes and so on. In this installation process, the mounting tabs 34 of the airbag 1, the mounting portion of the inflator 25 and the mounting brackets are mounted on the vehicle body 3 by mounting parts such as bolts. In addition, an electrical harness extending from the inflator 25 is connected to a control unit installed on the vehicle body 3. Then, the headlining is fixed on the roof panel of the vehicle body 3 and the pillar garnishes are fixed onto the pillars to surround the airbag apparatus 2. As described above, the installation of the airbag apparatus 2 is completed, as shown in FIG. 2.

After the installation of the airbag 1 on to the vehicle body 3 as mentioned above, in other words, after installing the airbag 1 in a folded condition onto the installed area along the upper edge of the specific plane 14 positioned above door openings, it is ensured that the open end of the inner tube 32 is folded with the pleats 67a of the first fabric 41 positioned inside (on the side of the vehicle compartment 4), as shown in FIG. 5. Furthermore, the folded portion 71 is rolled so that it is unrolled apart from the specific plane 14.

Next, the deployment of the airbag 1 is described hereinbelow.

The inflator 15 is activated to infuse gas by the controller at the collision or the rollover of the vehicle. The infused gas is introduced into the gas infusion portion 44 of the airbag 1 thorough the connecting pipe 25 and then infused into the inflating portion 43 of the main bag 33. Then, the inflating portion 43 of the main bag 33 tears the sleeve along a tear line and inflates and deploys with pushing away the headlining and so on. The airbag 1 deploys downward (i.e., to the prescribed direction along the specific plane 14) quickly to hang down like a curtain. Then the deployed airbag 1 covers side windows 8 and the center pillar 12 (see dashed lines in FIG. 2).

More precisely, in the inflating portion 43 (the gas guiding portion 46), the gas is supplied quickly through the gas flow portion 72 from front end to the rear end. Then, the inflating portion 43 guides ejection of the folded portion 71 to the prescribed direction. In addition, in the present embodiment, since the inner tube 32 is folded with the pleats 74a of the first fabric 41 facing the inside of the vehicle compartment 4, the inside portion of the gas guiding portion 46 tends to inflate more quickly than the outside portion of it. As a result, the folded portion 71 tends to eject to the outside. After the gas guiding portion 46 has been inflated to a prescribed volume, the folded portion 71 is ejected into the vehicle compartment 4. Then, gas is further supplied from the gas guiding portion 46 to the folded portion 71 and then the folded portion 71 is deployed to unroll its folded pattern on the specific plane 14. In other words, the gas is supplied to the is ejected out to the front and rear protection portions 47, 48 of the inflating portion 43 and then the front and rear protection portions 47, 48 deploy.

As described above, according to the airbag 1 of the present embodiment with the folded pattern for the curtain airbag, the pleated portion 74 having the above-mentioned umbrella-like cross section can be quickly deployed by the gas infusion from the inflator 25 at the collision or rollover of the vehicle, and the folded portion 71 can be unfolded (unrolled) and guided its ejection to the prescribed direction (to the outside downward) to deploy along the side windows 8 (the specific plane 14) with covering the side windows 8. Furthermore, the folded portion 71 folded in rolled pattern can deploy quickly and smoothly to unroll its rolled pattern on the side windows 8.

Furthermore, according to the airbag 1 of the present embodiment, since the open end of the inner tube 32 folded within the inflating portion 43 of the main bag 33 is folded only with the pleat 74a of the first fabric 41 facing the inside of the vehicle compartment 4, the inner tube 32 positioned inside and the inside pleat 74a of the pleated portion 74 inflates more quickly than the outside pleat 74a at the initial stage of the airbag deployment. As a result, the direction of the airbag 1 is regulated outward (to the direction along the side window) to achieve the good and stable deployment performance of the airbag 1.

If an airbag is folded into a so-called umbrella-like folded pattern with a folded portion (71) and a pleated portion (74) without any ingenuity, an open end of an inner tube (32) tends to be rolled with the folded portion or messily folded within any one of pleats (74a) of the pleated portion. As a result, since a tubular shape is hard to be deployed, the inner tube cannot supply gas into the airbag quickly and smoothly. On the contrary, with the airbag 1 of the present embodiment, since a fluid (an air) is injected through the inner tube 32 to the prescribed direction at the folding process of the airbag 1, the open end of the inner tube 32 is folded at the desired position properly. Then, the good and stable deployment performance of the airbag 1 can be achieved.

In the above embodiment, the open end of the inner tube 32 is folded within the pleats 74a of the first fabric 41 facing the inside of the vehicle compartment 4. However, the stable deployment performance of the airbag 1 can be achieved, if the open end of the inner tube 32 is folded within any one of the pleats 74a. For example, depending on the structure of the vehicle body 3, the open end of the inner tube 32 may be folded within the pleats 74a of the second fabric 42 positioned outside.

In case where the open end of the inner tube 32 is folded within the pleats 74a of the first fabric 41 facing the inside of the vehicle compartment 4, since the inside portion of the pleated portion 74 pushes the headlining along the side windows 8, the folded portion 71 tends to be ejected to the outside. This deployment manner of the airbag 1 is preferable if an inclination of the side windows 8 is greater. In case where the flexibility of the headlining is somewhat low (stiffness is somewhat great), the same effect (regulating the ejecting direction of the airbag) is achieved.

In case where the open end of the inner tube 32 is folded within the pleats 74a of the second fabric 42 positioned outside, the outside portion of the pleated portion 74 pushes the body panel of the vehicle body 3 and the inside portion of the pleated portion 74 pushed the headlining as a counteraction. The folded portion 71 tends to be ejected just downward after the headlining is pushed inward. Since this deployment manner can reduce impact to the headlining or the pillar garnishes, high impact-resistant material is unnecessary for the headlining or the pillar garnishes and a high degree of flexibility for selecting the material is provided.

In these manners, it can be determined within which pleat 74a of the first or second fabric 41, 42 the inner tube 32 is to be folded according to the material or the form factor of the headlining in order to achieve the more preferable deployment performance.

Since folding the open end of the inner tube 32 at the desired position can be achieved only with the supply of the fluid, the structure of the folding apparatus 61 is simplified and automated folding can be achieved to reduce production costs.

In addition, in this folding apparatus 61, the air injecting tube 67 can be changed its position at one side of the bracket 65 or another side. Then the direction of the air injection can be changed alternatively. Therefore, folding two kinds of the airbags for left and right side of the vehicle compartment 4 can be easily achieved with any one folding apparatus 61.

Furthermore, in this folding apparatus 61, the blade 69 rolls the main bag 33 to form the folded potion 71 and directly put the folded potion 71 into the bracket 65. Therefore, the production process can be accelerated.

The folding pattern of the folded portion 71 is not limited to the above-mentioned embodiment. For example, the rolled direction to the specific plane 14 may be counter-direction. In this case, the folded portion 71 may deploy with rubbing the specific plane 14.

The gas infusion portion 44 can be positioned at a center or front portion of the main bag 33 in a longitudinal direction.

The inner tube 32 may be formerly attached onto the first or second fabric 41, 42. For example, two-sided dotted adhesive tape is attached onto the outer surface of the inner tube 32 and the inner tube 32 is attached onto the inside surface of the first or second fabric 41, 42. Then the first and second fabric 41, 42 are joined each other by being sewn.

The airbag 1 of the above-mentioned embodiment deploys downward along the side windows 8 to cover the side windows 8. However, deployment direction is not limited. The airbag of the present invention can be applied to an airbag which deploys planarly to a prescribed direction along a prescribed plane.

What is claimed is:

1. An airbag comprising:
   (a) an airbag main portion including
      (x) a gas infusion portion through which gas is infused into an inside of the airbag main portion, and
      (y) an inflating portion which is communicated with the gas infusion portion and has first and second fabrics between which the gas is infused through the gas infusion portion to inflate the inflating portion; and
   (b) an inner tube provided from the inside of the gas infusion portion to the inside of an upstream portion of the inflating portion, wherein
   the upstream portion of the inflating portion is pleated to form a pleated portion in which the first and second fabrics form a pair of pleats extending counter directions to each other and
   the inner tube is folded with either one of the pleats.

2. The airbag according to claim 1, wherein
   a downstream portion of the inflating portion is folded to form a folded portion which is folded to be wrapped by the pleated portion.

3. An airbag apparatus comprising:
   (i) an airbag which deploys along a side window inside a vehicle compartment and comprises
      (a) an airbag main portion including
         (x) a gas infusion portion through which gas is infused into an inside of the airbag main portion, and
         (y) an inflating portion which is communicated with the gas infusion portion and has first and second fabrics between which the gas is infused through the gas infusion portion to inflate the inflating portion; and
      (b) an inner tube provided from the inside of the gas infusion portion to the inside of an upstream portion of the inflating portion, wherein
      the upstream portion of the inflating portion is pleated to form a pleated portion in which the first and second fabrics form a pair of pleats extending counter directions to each other,
      a downstream portion of the inflating portion is folded to form a folded portion which is folded to be wrapped by the pleated portion, and
      the inner tube is folded with any one of the pleats; and
   (ii) an inflator for infusing gas into the gas infusion portion of the airbag, wherein
   the first fabric of the airbag is developed so that the surface of the first fabric faces the inside of the vehicle compartment, and
   the inner tube of the airbag is folded with the pleat of the first fabric.

4. A method for folding an airbag; the airbag comprising
   (a) an airbag main portion including
      (x) a gas infusion portion through which gas is infused into an inside of the airbag main portion, and
      (y) an inflating portion which is communicated with the gas infusion portion and has first and second fabrics between which the gas is infused through the gas infusion portion to inflate the inflating portion; and
   (b) an inner tube provided from the inside of the gas infusion portion to the inside of an upstream portion of the inflating portion, wherein
   the upstream portion of the inflating portion is pleated to form a pleated portion in which the first and second fabrics form a pair of pleats extending counter directions to each other, and the inner tube is folded with any one of the pleats; the method comprising:
- infusing fluid into the inside of the inner tube from a prescribed direction to inflate the inflating portion and detach the first and second fabrics from each other, and
- pleating the inflating portion to form the pleated portion under the condition where the inner tube is positioned along any one of the first and second fabrics by the infused fluid.

5. A method for folding an airbag; the airbag comprising
(a) an airbag main portion including
  (x) a gas infusion portion through which gas is infused into an inside of the airbag main portion, and
  (y) an inflating portion which is communicated with the gas infusion portion and has first and second fabrics between which the gas is infused through the gas infusion portion to inflate the inflating portion; and
(b) an inner tube provided from the inside of the gas infusion portion to the inside of an upstream portion of the inflating portion, wherein the upstream portion of the inflating portion is pleated to form a pleated portion in which the first and second fabrics form a pair of pleats extending counter directions to each other, a downstream portion of the inflating portion is folded to form a folded portion which is folded to be wrapped by the pleated portion, and the inner tube is folded with any one of the pleats; the method comprising folding the inflating portion to form the folded portion which is apart from the gas infusion portion, infusing fluid into the inside of the inner tube from a prescribed direction to inflate the inflating portion except the folded portion and detach the first and second fabrics from each other, and pleating the inflating portion except the folded portion to form the pleated portion under the condition where the inner tube is positioned along any one of the first and second fabrics by the infused fluid.

* * * * *